F. G. SIWECKI.
LOCKING DEVICE FOR AUTOMOBILES.
APPLICATION FILED FEB. 18, 1921.
1,400,243.
Patented Dec. 13, 1921.
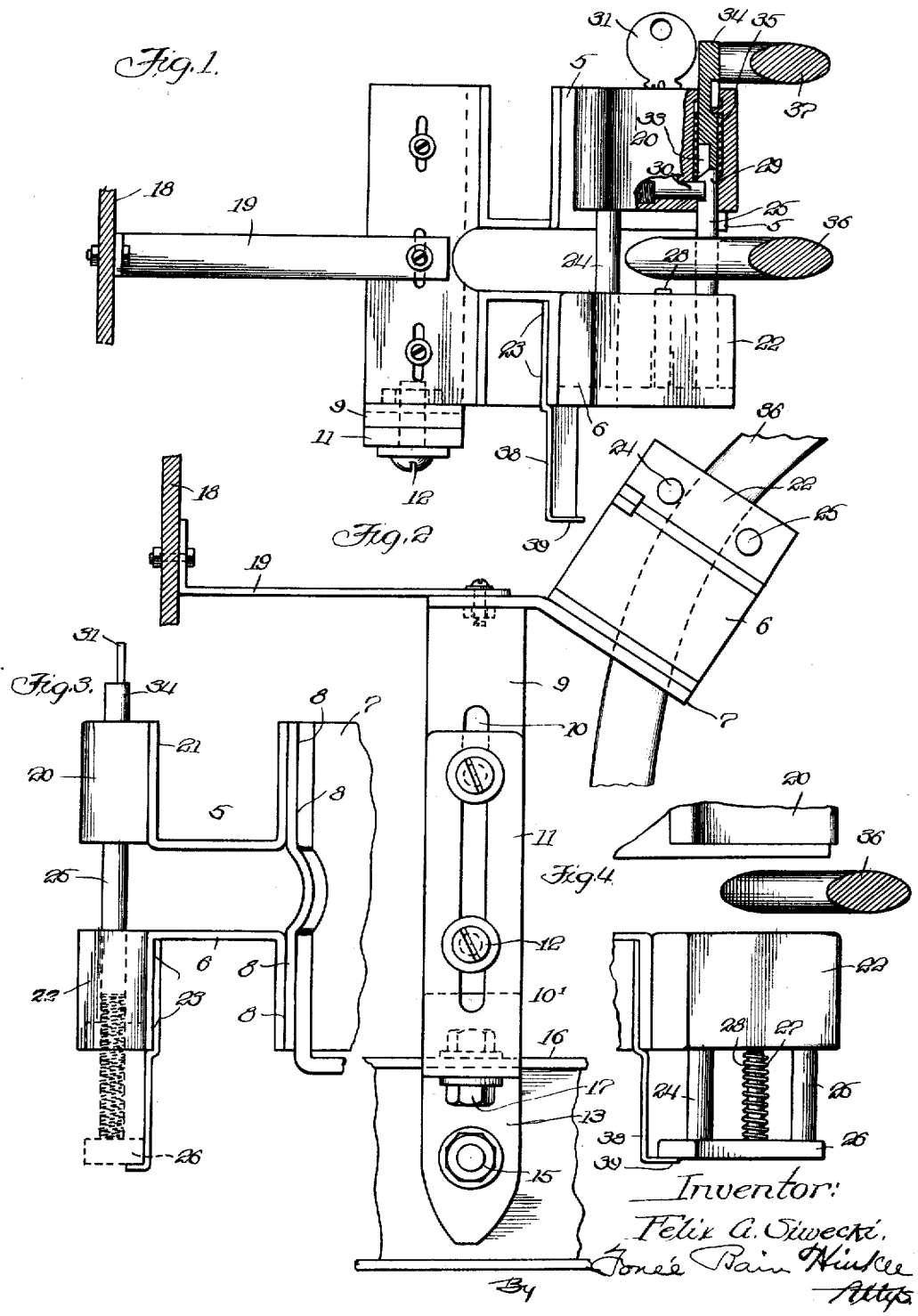

UNITED STATES PATENT OFFICE.

FELIX G. SIWECKI, OF CHICAGO, ILLINOIS.

LOCKING DEVICE FOR AUTOMOBILES.

1,400,243.  Specification of Letters Patent.  Patented Dec. 13, 1921.

Application filed February 18, 1921. Serial No. 446,009.

*To all whom it may concern:*

Be it known that I, FELIX G. SIWECKI, a citizen of the United States, residing at Chicago, in the county of Cook and State of Illinois, have invented certain new and useful Improvements in Locking Devices for Automobiles, of which the following is a specification.

The invention relates to improvements in locking devices for automobiles.

One of the objects of the invention is to provide an improved means for locking the controlling levers of an automobile.

Another object of the invention is to provide a locking means for the controlling levers of an automobile which may easily and conveniently be put in locking position by slight movement of the foot of the driver.

Another object of the invention is to provide a locking means or apparatus for two or more of the controlling levers of an automobile.

Another object is to provide a convenient means for attaching the locking device to the standard frame of an automobile.

Other, further and more specific objects of the invention will become readily apparent, to persons skilled in the art, from a consideration of the following description when taken in conjunction with the accompanying drawings, wherein:—

Figure 1 shows a plan view of the locking device as it appears in connection with the controlling levers of an automobile.

Fig. 2 is a side elevation of the device.

Fig. 3 is an end elevation of the device showing the bolts in locking positions.

Fig. 4 is a broken away portion of a plan view of the device showing the bolts in unlocking position.

In all the views the same reference characters are employed to indicate similar parts.

In the construction shown 5 and 6 are a pair of brackets fixed to a plate 7, as by spot welding 8, rivets, or by any suitable means by which the parts are inseparably joined. In like manner the plate 7 is connected to an upright 9.

The upright member 9 is slotted, as at 10, for axial adjustment with a similar upright member 11. These members are connected together by screws 12, and are axially adjusted to compensate for variations in dimensions of the automobile upon which the device is to be placed. The lower end of the member 11 is secured to a bracket 13, which is supported on a frame member 14 of the automobile by the bolt 15. The bracket 13 is also secured to the flange 16 of the frame member 14, by bolt 17.

The upper end of the member 9 is secured to the vertical wall 18 of the automobile by a strap 19 in any suitable manner. The bracket 5 is secured to a lock 20 by spot welding, or the like, as at 21.

A bolt guide 22 is inseparably secured to the bracket 6, as by spot welding 23, or any other suitable manner. Two lock bolts 24 and 25 are guided in the member 22. The lock bolts 24 and 25 are held together at their outer ends by a cross piece 26 and are yieldingly held in their outward positions by a spring 27, that is coiled about a rod 28, fixed to the cross piece 26, which moves with the lock bolts 24 and 25. One or both of the lock bolts, 24 and 25, is provided with a notch 29 on its end, as more clearly shown in Fig. 1, to engage a spring bolt 30 in the lock 20. When the key 31 in the lock 20 is turned, the lock bolt 30 is withdrawn from the notch 29 in the bolts 24 and 25 and the spring 27 will return said bolts to the position shown in Fig. 4.

The orifice 33, in which the lock bolt 25 is caused to enter, extends through the lock and contains a spring pressed bolt 34, normally held in the lock by a spring 35 except when moved out by the bolt 25, as shown in Fig. 1, when the bolts is in locked position.

The lock 20 and the guide 22 are spaced apart to admit one of the controlling levers 36 therebetween. The controlling lever 36 is shown in Fig. 1 to be located between these members and the lock bolts 24 and 25. In order to start the automobile it is necessary that this lever be removed from such a position and therefore when it is confined by the lock bolts 24 and 25, it is impossible to move it preliminarily to starting the automobile. It will be observed, furthermore, that the spring-pressed bolt 34 extends outwardly from the lock, as shown in Fig. 1, and prevents forward movement of the lever 37, the movement of which from this position is so essential in the operation of the automobile.

A stop plate 38 has a flanged end 39 that serves as a stop to prevent excessive outward movement of the cross bar 26 and the connected lock bolts 24 and 25 by operation of the spring 27.

To lock the automobile to prevent unauthorized use of the vehicle, it is only necessary to bring the lever 36 into the position shown in Fig. 3, which is the position it occupies when the automobile is at rest, and pressing the lock bolts 24 and 25 into position shown in Fig. 1 against the resilient resistance interposed by the spring 27. The toe of the operator's foot when moved to the right will cause the bolts 24 and 25 to enter the lock, on either side of the lever 36 and become automatically engaged with the spring bolt 30 of the lock, and thereby held in locked position, rendering the controlling levers 36 and 37 ineffective for the purpose of starting the car.

To unlock the device it is only necessary to insert and turn the key 31, whereupon the spring 27 will cause the bolts 24 and 25 to be withdrawn from the lock and to be returned to the positions shown in Fig. 4, and the bolt 34 will be returned into the interior of the lock by operation of the spring 35.

The ease and facility with which the levers may be locked in place readily commends itself. Of course when the device is locked, key 31 is not present in the lock, but when it is desired to unlock the device, the opening in the lock is accessible to the driver who may stand upon the ground and unlock the device before entering the vehicle.

While I have herein shown a single embodiment of my invention for the purpose of clear disclosure, it will be manifest, to persons skilled in the art, that considerable change in the configuration, design and arrangement of the parts may be made within the scope of the appended claims.

Having described my invention, what I claim as new and desire to secure by Letters Patent, is:—

1. A device to lock a controlling lever of an automobile providing a bracket supported on the automobile; a lock casing and a bolt guide spaced apart on the bracket to admit a lever therebetween; two spaced-apart lock bolts arranged to enter the lock casing, carried by said guide; a cross member connecting the outer ends of said bolts; a spring pressed latch within the lock casing engaging one of said bolts and arranged to be withdrawn by a key and a spring to return said lock bolts to unlocked position when released by the key.

2. A device of the character described comprising a spring lock to receive two parallel sliding bolts; a spaced away bolt guide supporting said bolts in register with the bolt receiving openings in the lock casing to admit a lever of the automobile therebetween; a spring to normally hold the bolts out of the lock and means in the lock casing to hold the bolts therein with the bolts on either side of a controlling lever that may be released by a key and a spring pressed bolt in the lock casing displaced from the interior of the lock by the entrance of one of the aforesaid lock bolts, into the path of another controlling lever of the automobile.

In testimony whereof I hereunto subscribe my name.

FELIX G. SIWECKI.